United States Patent Office 3,257,559
Patented June 21, 1966

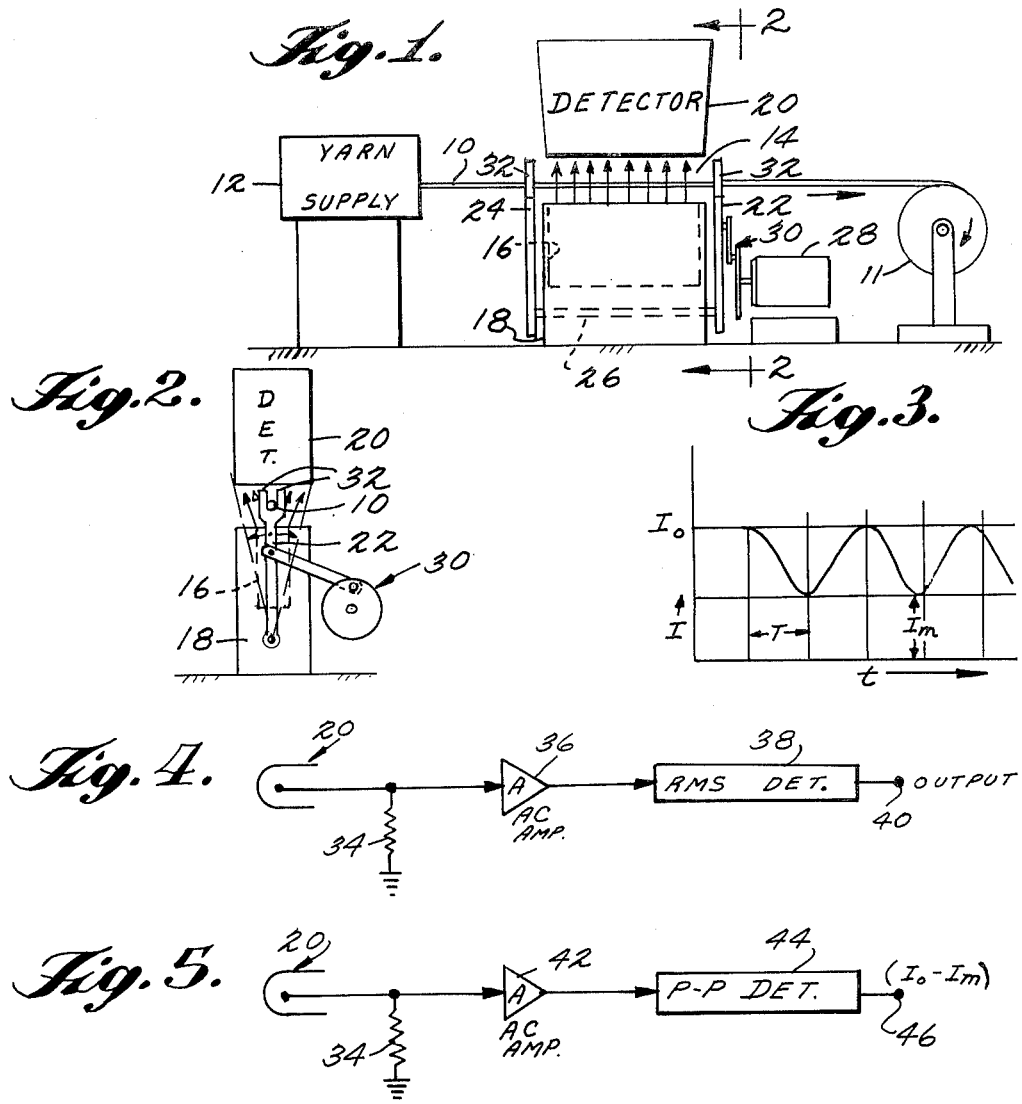
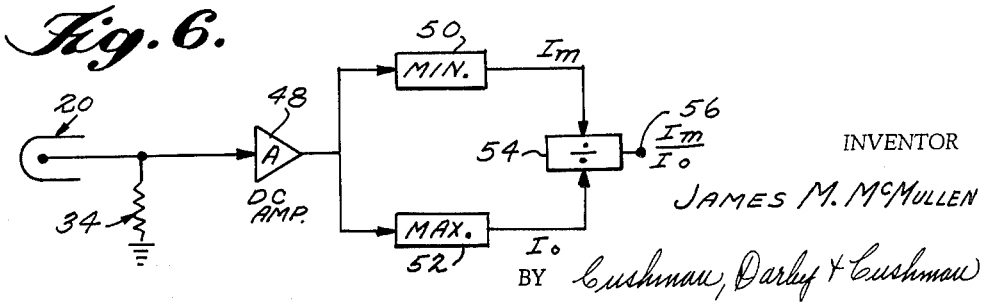

3,257,559
YARN DENIER GAUGE WITH FLUTTER
EFFECT ELIMINATION
James M. McMullen, Columbus, Ohio, assignor to Industrial Nucleonics Corporation, a corporation of Ohio
Filed May 31, 1963, Ser. No. 284,521
19 Claims. (Cl. 250—83.3)

This invention relates to sensing the weight per unit length of elongated, narrow, flexible material, such as yarn or the like, as it moves lengthwise through a radiation field.

A growing interest has developed in industry to measure the weight per unit length of such materials, particularly single yarn. Generally, most yarn weight is measured in terms of "denier," which is a measure of weight per unit length. Denier is defined as the number of unit weights of 0.05 gm. per 450 meter length of yarn, or simply, one denier equals 1 gm. per 9,000 meters.

In the textile industry, the term "yarn" may refer to continuous strands of fiber or filaments in a form suitable for intertwining to form a fabric, or it may refer to a number of the fibers twisted together or a number of filaments laid side-by-side without twist. It may also refer to a single heavy filament with or without twist, called a monofilament yarn. The essential difference between fiber and filament is that fiber is considerably shorter. Therefore a yarn made up of fiber may be twisted to produce strength, whereas a filament yarn may have considerable strength without twisting. Accordingly, "yarn" as used herein is to be considered in its broadest sense so as to include any one of the different types of make-ups just mentioned.

Passing material of various kinds through a radiation field derived from a radioactive source and detecting the resultant field by an ionization chamber or other types of detectors is well known in the art. For example, in the Bossen Patent 2,922,188, which issued January 26, 1960, to the assignee of the present invention, there is disclosed a beta gauge for measuring the weight per unit length of a number of separated threads or fibers being drawn into a single yarn. The present invention may be employed with the Bossen arrangement especially to measure the denier of the single yarn.

One of the problems which has caused inaccuracies in the denier measurements is that which results from "flutter" of the yarn as it moves longitudinally through the radiation field. This flutter is erratic or random and refers to movement within the radiation field in various directions other than longitudinally. Flutter movements are transverse of the radiation field, e.g., horizontal assuming a vertical field, as well as in the direction of the field. Random transverse flutter contributes to inaccuracies in measurement because of the varying amount of yarn that is found in the detected radiation field from time to time and is, therefore, objectionable. On the other hand, flutter movements of the yarn back and forth vertically (assuming a vertical field) has little overall effect on the scatter and absorption of the field by the yarn.

It is, therefore, the primary object of this invention to eliminate the effect of the objectionable transverse flutter normally encountered in measuring the weight per unit length of flexible type material such as yarn, by positively controlling the movement of the yarn so as to cause it to traverse the radiation field with an amplitude which exceeds the width of that field. In that manner, the radiation field is detected both with and without the material in it, preferably on a cyclic basis, so that the maximum effect of the yarn may be determined without question from the detector output.

Other objects and advantages of this invention will become apparent to those of ordinary skill in the art upon reading the appended claims and the following detailed description of various embodiments of the invention, in conjunction with the drawings, in which:

FIGURE 1 is a partially diagrammatic illustration showing detailed equipment for controlling movement of the yarn;

FIGURE 2 is a cross-sectional view taken substantially along line 2—2 of FIGURE 1;

FIGURE 3 is a graph illustrating the general type of waveform available from the detector in accordance with this invention;

FIGURE 4 is a schematic illustration of circuitry for determining the R.M.S. value of the detector output wave of FIGURE 3;

FIGURE 5 is a schematic illustration of circuitry for determining the peak-to-peak value of the detector output wave of FIGURE 3; and FIGURE 6 is a schematic illustration of circuitry for ratioing the minimum and maximum D.C. values of the detector output wave of FIGURE 3.

In FIGURE 1 the elongated material of small cross-section, such as yarn 10, the weight per unit length or denier of which is to be measured before take up on reel 11, for example, may be supplied from any suitable source 12. In other words, source 12 may be any conventional reel or bobbin, a winder bar such as bar 56 in the above mentioned Bossen patent, or any other element used in the process of making natural or synthetic yarn or any other type of elongated material, which is flexible and subject to transverse flutter in passing longitudinally through a radiation field.

For purposes of producing the radiation field or beam 14, a suitable radiation source 16 is disposed in container 18 and preferably comprises a sealed capsule containing a small quantity of beta ray emitter radio-isotope such as krypton-85, strontium-90, or thallium-204. Radiation detector 20 may be an ionization chamber or of the Geiger-Muller type for example, and is preferably disposed on the opposite side of yarn 10 from source 16, though a back-scatter or radiation reflective type arrangement may be employed if desired.

From FIGURE 2, it will be noted that in the specific embodiment described, the width of the radiation field 14 is considerably greater than the width of yarn 10. An active source width of twice the yarn width may be employed. On the other hand, basically this invention does not require the radiation beam to be wider than the material being measured.

To eliminate the effect of random or erratic flutter of yarn 10 as it is moved lengthwise between the radiation source and detector, for example, by the motorized pull from reel 11, a controlled side-to-side or transverse movement of the yarn is effected so as to cause the yarn to move completely out of the radiation beam on either side thereof. This is accomplished by the forked shape guiding elements 22 and 24, which are disposed at opposite ends of the source container 18 and connected for unison pivotal movement by shaft 26. The yarn is caused to oscillate transversely by connection of motor 28 to guiding elements 22 via an eccentric 30. It will be appreciated from the drawing that yarn 10 slides in the groove formed by forks 32 of the guiding elements 22 and 24 during its longitudinal movement as it is simultaneously moved from side-to-side. It is the object of this transverse movement to cause the yarn to move completely out of the detected radiation field so that then none of the detected radiation is intercepted and absorbed by any part of the yarn. At other times while the yarn is in the field, however, the detector senses only the radiation which is not absorbed by the yarn. It is well known that absorption of radiation by material is a function of the density of that material and the quantity thereof disposed in the path of the emanations. As a result, the emanations intercepted by the detector while the yarn is in the radiation field, vary as an inverse function of the weight of the yarn disposed between the source and detector. The measured unit length of the yarn is therefore determined by the length of the detector and source in the direction parallel to the yarn axis. Sufficient length of the detector and source is preferably utilized in order to provide sufficient source output without any necessity of averaging measurements over an excessive length of yarn.

If the output of detector 20 is designated $I_0$ when the yarn is out of the radiation field, then the detector output I with the yarn in the field will be in accordance with the following expression:

$$I = I_0 e^{-ux}$$

wherein:

$e$ is the Napierian base of natural logarithms,
$u$ is the mass absorption coefficient of the material being measured for the particular type of radiation employed and the particular source and detector geometry employed in the apparatus, and
$x$ is a function of the weight per unit length of the yarn.

As the guide elements 22 and 24 oscillate the yarn, the detector output signal I becomes a periodic function of time as graphically displayed in FIGURE 3. Successive positive peaks have a value of $I_0$, since at these times the yarn is fully outside the radiation field. T in FIGURE 3 represents the half-period of the guide motion.

There are several ways in which the detector output signal can be interpreted electrically. For example, a D.C. amplifier operating into an integrator could be employed satisfactorily, or any of the arrangements indicated in FIGURES 4, 5 and 6 may be used. In each of these figures the signal from detector 20 is developed as a voltage across a high megohm resistor 34. In FIGURE 4, the output of this resistor is connected via an A.C. amplifier 36 to a circuit 38 for detecting the R.M.S. (root-mean-square) value of the amplified output signal to give a continuous indication at terminal 40 of the denier of the yarn being measured. This technique requires the total waveform be reproducible, however.

In FIGURE 5, the detector output signal as amplified by A.C. amplifier 42 is interpreted by determining the successive peak-to-peak values by detecting the maximum $I_0$ and minimum $I_m$ values with detector 44 and continuously presenting their difference $(I_0 - I_m)$ at terminal 46 as an indication of the denier of the yarn which is independent of waveform.

Another way of interpreting the detector output signal, as shown in FIGURE 6, includes the use of a D.C. amplifier 48 the output of which is applied in parallel to minimum and maximum sensing circuits 50 and 52. These circuits provide to the divider circuit 54 the minimum D.C. value $I_m$ of the detector waveform such as shown in FIGURE 3, and the maximum value $I_0$ thereof, each cycle so as to present at terminal 56 a continuous ratio of $I_m$ to $I_0$. This latter way of interpreting the detector output provides a signal which is not only independent of waveform but also continuously standardized.

It is thus apparent that this invention provides a method and apparatus for successfully accomplishing the stated objects and advantages. Yet other objects and advantages, and even further modifications of the invention, will become apparent to those of ordinary skill in the art upon reading the foregoing disclosure. However, it is to be understood that this disclosure is intended to be exemplary and not limitative, the scope of the invention being defined by the appended claims.

What is claimed is:

1. In apparatus for sensing the weight per unit length of an elongate material subject to random transverse flutter as it moves lengthwise through a nuclear radiation field sensed by detector means, the improvement comprising:

means for preventing the effect of said flutter by controllingly and recurrently moving the elongate material transversely into and fully out of the radiation field sensed by said detection means, as the material moves lengthwise as aforesaid, for causing the output of said detector means to vary from one extreme when the material is out of the radiation field through the other extreme when the material is in said field during its transverse movement, and means responsive to said output for electrically interpreting the same.

2. Apparatus as in claim 1 wherein said moving means causes said material to oscillate across said sensed field at such an amplitude as to cause the material to move completely out of the sensed field at both sides thereof, said detector means output being then maximum.

3. Apparatus as in claim 1 wherein said interpreting means includes means for detecting the R.M.S. value of said detector means output.

4. Apparatus as in claim 1 wherein said interpreting means includes means for detecting peak-to-peak values of the said detector means output.

5. Apparatus as in claim 1 wherein said interpreting means includes means for ratioing minimum and maximum signals in said detector means output.

6. Apparatus as in claim 1 including means for moving said material lengthwise as aforesaid.

7. Apparatus as in claim 1 wherein said preventing means includes at least one forked shaped element for transversely guiding said material and means for causing said element to move said material recurrently across said radiation field as aforesaid.

8. In apparatus for measuring the weight per unit length or denier of yarn as it is moved lengthwise, comprising:

radioactive source means for providing a radiation beam, means for preventing transverse flutter of the yarn in said beam by controllingly moving said yarn transversely fully in and fully out of said radiation beam continuously as the yarn moves lengthwise, and detector means for sensing said radiation beam as modulated by the transversely moved yarn to provide an output indicative of the weight per unit length of yarn so measured.

9. Apparatus as in claim 8 and further including means for interpreting the detector means output comprising means for determining the R.M.S. value of said output.

10. Apparatus as in claim 8 and further including means for interpreting the detector means output comprising means for determining the peak-to-peak value of said output.

11. Apparatus as in claim 8 wherein the active source width of said source means is approximately twice the width of said yarn.

12. Apparatus as in claim 8 and further including means for interpreting the detector means output comprising:

means for determining the ratio of successive minimum and maximum values in said output.

13. Apparatus as in claim 8 wherein the width of said radiation beam traversed by said yarn is greater than the width of the yarn.

14. Apparatus as in claim 8 wherein said moving means moves said yarn back and forth across and completely out from both sides of said radiation beam for causing said detector means output to pass through a minimum while the yarn is in said beam to a maximum when the yarn is completely on either outside of said beam.

15. Apparatus as in claim 14 wherein said moving means comprises a pair of forked shaped elements respectively at opposite ends of said source and detector means for transversely guiding said yarn, and means for effectively reciprocating said guiding elements to move the said yarn across the radiation beam as aforesaid.

16. Apparatus as in claim 15 wherein said guiding elements have respective yarn carrying forks at their upper end and are pivoted at their lower end, said reciprocating means including motorized eccentric means for driving said guiding elements.

17. In apparatus for sensing the weight per unit of length of an elongate material by sensing with detector means the effect of the material in a nucleonic radiation field, the improvement comprising:
   means for moving said material lengthwise through said field and thereby subjecting the material to random flutter in a direction generally transverse to both said field and lengthwise direction of said material,
   means for preventing the effect of said flutter by controllingly oscillating said elongate material in the radiation field sensed by said detector means, as the material is moved lengthwise as aforesaid, to cause the output of said detector means to alternate between maximum and minimum values, and
   means responsive to said output for interpreting same based on said values.

18. Apparatus as in claim 17 wherein said preventing means includes at least one forked shaped element for transversely guiding said material, and means for causing said element to oscillate said material across said field as aforesaid.

19. In the method of gauging the weight per unit length of material such as yarn or the like which is subject to random transverse flutter as it moves lengthwise through a detected nucleonic radiation field, the improvement of:
   controlling moving said material back and forth across the width of said field with an amplitude sufficient to go completely outside thereof so as to allow detection of the field both with and without the material in it and thereby obviate said flutter and the effect thereof.

References Cited by the Examiner
UNITED STATES PATENTS

| | | | |
|---|---|---|---|
| 2,824,487 | 2/1958 | Roehrig | 250—219.1 |
| 2,883,552 | 4/1959 | Faulkner | 250—83.3 |
| 2,886,714 | 4/1959 | Ewald | 250—83.3 |
| 2,889,463 | 6/1959 | Linsert | 250—83.3 |
| 2,999,932 | 9/1961 | Spooner | 250—83.3 |

References Cited by the Applicant
UNITED STATES PATENTS

| | | |
|---|---|---|
| 3,185,924 | 5/1965 | Locher. |
| 3,221,171 | 11/1965 | Locher. |

RALPH G. NILSON, *Primary Examiner.*

JAMES W. LAWRENCE, *Examiner.*